June 24, 1930.  N. Z. BUTTERICK  1,766,877
ACCELERATOR CONTROL
Filed Aug. 18, 1928  2 Sheets-Sheet 1
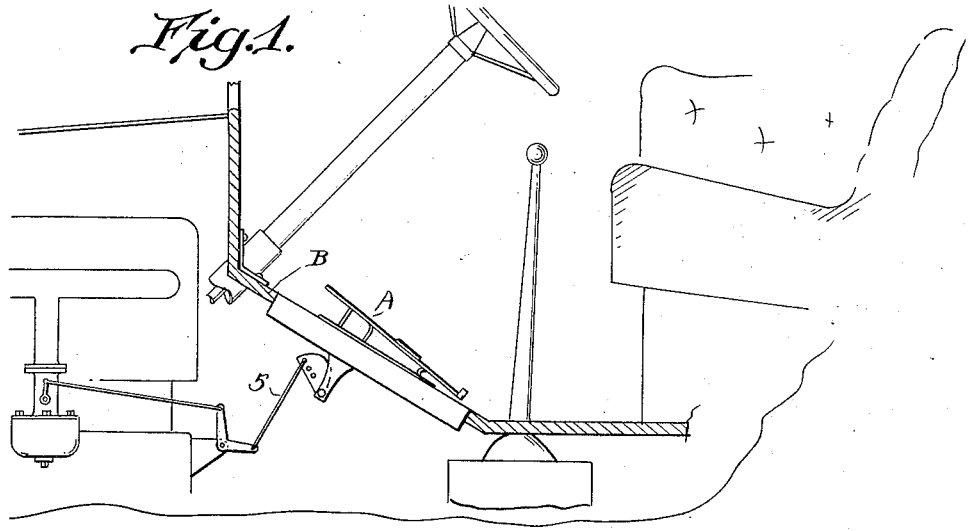
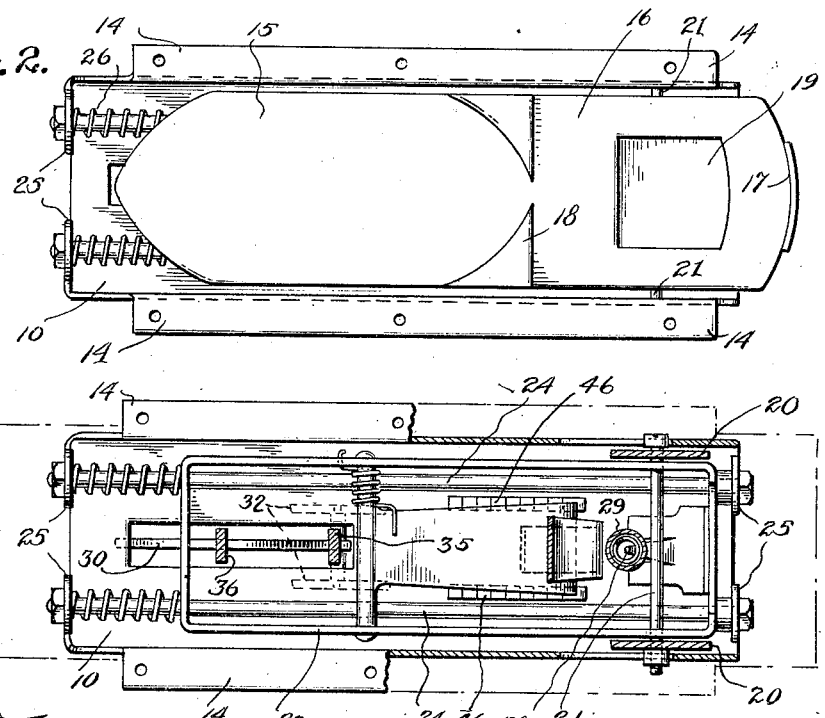
Inventor
N. Z. Butterick
By
Eugene E. Brown
Attorney

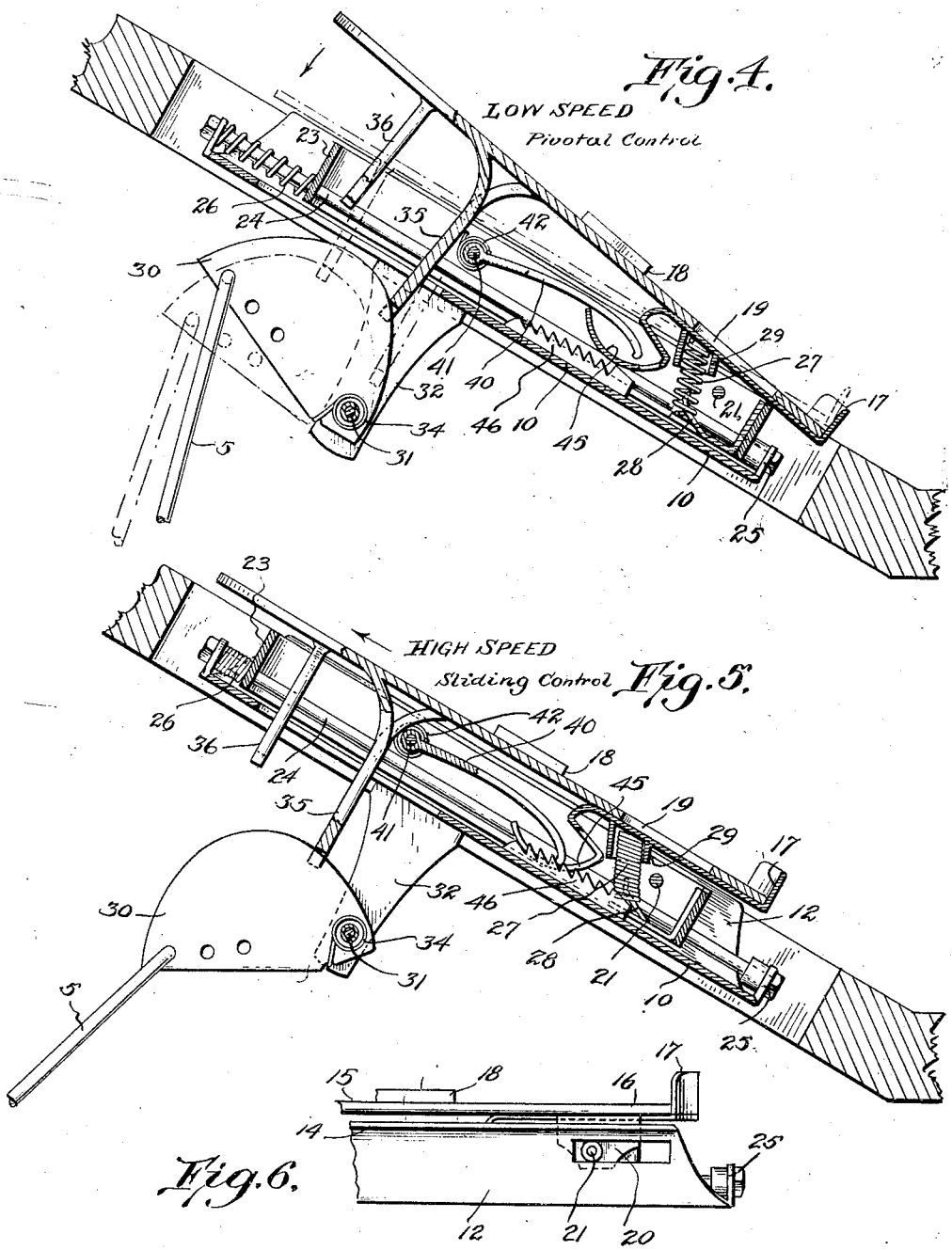

Patented June 24, 1930

1,766,877

UNITED STATES PATENT OFFICE

NAASON Z. BUTTERICK, OF MIAMI, FLORIDA

ACCELERATOR CONTROL

Application filed August 18, 1928. Serial No. 300,472.

This invention relates to a pedal control device for actuating the accelerator used to control the throttle lever of internal combustion engines of motor vehicles.

One object of my invention is to provide a control device in which the foot may rest firmly upon the pedal at all times so that the muscles of the operator will not be subjected to the strain and fatigue which is at present experienced when driving an automobile.

Another object is to provide an accelerator pedal device which may be adjusted or set to produce a definite speed within the limit prescribed within congested districts when the pedal is pressed down to its full limit but which may be increased as desired when traveling in unrestricted or open spaces by a sliding movement of the pedal.

A further object is to provide an accelerator control device which moves the throttle lever by definite increments and maintains it in fixed position at each stage of adjustment thereby feeding the gasolene to the motor at a constant rate without fluctuation.

Other objects will appear from the following description in connection with the accompanying drawings, in which—

Figure 1 is a conventional illustration showing in section the forward portion of an automobile provided with my accelerator control device;

Figure 2 is a top plan view of the device;

Figure 3 is a top plan view of the same with the foot plate removed;

Figures 4 and 5 are longitudinal sectional views of the same; and

Figure 6 is a fragmentary side elevation of the rear portion of the device.

My accelerator control A may be supported upon the floor board B of an automobile and be connected by means of the usual link rod 5 with the throttle lever of the engine. The supporting frame may be provided with a bottom portion 10 and sides 12 having lateral supporting flanges 14. The foot pedal is provided with a sole portion 15 and a heel portion 16 having a flange 17 to bear against the rear of the heel and an abutment 18 to receive the thrust from the front edge of the heel when the foot is slid forwardly. A depression or socket 19 may be formed in the heel portion to receive the heel of a woman's shoe.

The pedal is provided adjacent the rear end with lateral depending ears 20 to hinge upon a pivot rod 21 which is carried by the rectangular carriage 23, slidably mounted upon guide rods 24 secured to end lugs 25 projecting upwardly from the bottom plate 10. The carriage is normally moved to the rearmost position as shown in Fig. 4, by springs 26 surrounding the forward ends of the guide rods. The pedal is normally held in inclined position with the forward end raised, as in Fig. 4, by a coiled spring 27 held between a stud 28 projecting from the rear end of the carriage, and a socket 29 depending from the heel portion.

The adjusting member to which the throttle lever is connected is shown as a plate 30 pivoted at 31 between a pair of standards or posts 32 depending from the bottom member 10, the plate having an arcuate upper edge and being normally swung upwardly by a spring 34 coiled about the pivot pin 31. An operating arm or stem 35 projects downwardly from the pedal and is provided with a bifurcated end to engage and ride along the arcuate edge of the pivoted accelerator adjusting member 30.

The operation of the parts above described will be evident. When the pedal is elevated to its highest position as indicated in solid lines in Fig. 4, the carbureter is adjusted for the idling operation of the engine. To increase the speed, the operator gradually depresses the pedal thereby causing the stem 35 to move rearwardly over the arcuate edge of the accelerator member 30, causing the latter to swing downwardly on its pivot pin and thereby opening the throttle. Just before the pedal reaches its lowermost position, indicated by the broken lines, an auxiliary operating stem 36, engages the accelerator member 30 adjacent its center and holds it firmly and steadily. This auxiliary stem 36 is not absolutely necessary but may be used advantageously by reason of its leverage from the pivot pin. The parts may be so proportioned that the motor vehicle will be operated at the maximum allowed within the speed limit allowed within city limits when the pedal is fully depressed to the position shown in broken lines. The speed is decreased by rocking the foot pedal upwardly. If the operator removes his foot the parts will instantly return to normal or idling position.

For the purpose of increasing the speed beyond the predetermined speed attained by the pivotal or rocking movements above described I provide mechanism which is actuated by a sliding movement of the pedal. When the pedal is fully depressed as shown in broken lines in Fig. 4, the operating stem 35 has been moved rearwardly and downwardly along the curved edge of the accelerator member to a position adjacent the pivot. It will be evident that if the pedal is slid forwardly while fully depressed, the operating stem 35 will move forwardly along the curved or arcuate edge of the member 30, causing it to swing downwardly about its pivot still further and thereby opening the throttle to a greater extent.

The sliding carriage 23, is provided with a pawl or dog 40 pivoted at 41 and yieldingly urged downward by a spring 42 coiled about the pivot pin. A plate secured to the bottom of the heel portion of the pedal and which is flanged at 17 to form a stop or rest for the operator's heel, is bent at its forward end to form an arcuate support ledge 45 which engages the dog 40 and holds it out of engagement with the racks 46 carried by the bottom plate, until the pedal is fully depressed and begins to move forwardly. Hence as long as the pedal is only operated with a pivotal movement to control the acceleration between the idling and predetermined speed, the dog 40 is held out of engagement with the rack-bars by the hook member 45. As soon, however, as the depressed pedal is slid slightly forward the end of the dog drops into the first notch in the rack-bar and prevents any backward movement. Each time the pedal is slid forward the distance of one tooth, the dog rides over the tooth and drops into the next notch. In this manner the pedal can be slid forwardly step by step and will be prevented from any backward movement by the engagement of the dog with the rack-bar. The pedal is thus automatically held firmly at each position so that the operator may bear hard against the heel flange 17 and thus relieve the leg muscles of all strain.

If it is desired to decrease the speed at any time the pedal is first rocked upwardly to release the dog and may then be retracted or eased backwardly to the desired extent and again depressed to engage the dog with the rack-bar.

If the operator removes his foot at any time the pedal will first be swung upwardly on the pivot rod 21 by the spring 27 and the carriage will then be returned to initial position by the springs 26, thus immediately bringing the accelerator to idling position.

The rate of acceleration can be regulated by the shape of the arcuate edge of the accelerator member 30 and this can be varied to suit different conditions by substituting accelerator members of different shapes. The parts can be so designed that the up and down or rocking movement of the pedal varies the speed from the idling speed to a predetermined speed, such as 20 or 25 miles per hour, the usual limit within city limits, so that the operator is thus sure that when the pedal is fully depressed he is not exceeding the speed limit. When traveling beyond the restricted area the speed may be at once increased merely by sliding the pedal forward until the desired speed is attained.

Touring over long distances may be accomplished with comfort because the foot is firmly supported on the pedal with the weight of the limb resting against the heel plate, no effort being required to hold the accelerator in any desired position. Moreover a steady even flow of gasolene is maintained at all speeds regardless of the character of the road.

I have described the construction illustrated in detail for the purpose of clearly disclosing one embodiment of my invention but it will be evident that various changes and modifications can be made within the scope of the invention.

I claim:

1. A device adapted to operate the throttle controlling the speeds of a motor vehicle, comprising a support, a pedal mounted for pivotal and slidable movements thereon, operative means connecting said pedal and the throttle, said operative means being actuated first by the pivotal movement of the pedal and then further actuated by the sliding movement of the pedal.

2. An accelerator control device, comprising a carriage, a pedal mounted for pivotal movement thereon and bearing thereon throughout its extent when fully depressed, guiding means for the carriage, said carriage and pedal being slidable upon said guiding means and holding means brought into action when the pedal is fully depressed to prevent rearward movement while permitting forward movement of the pedal.

3. In an accelerator control device as set forth in claim 2, means for rendering said holding means ineffectual when the pedal is not fully depressed.

4. An accelerator control device, comprising a support, a pedal mounted for pivotal and slidable movements thereon, means normally holding said pedal in raised position, retractile means normally holding said pedal in rearmost retracted position on said support, the pivotal motion of the pedal controlling the accelerator between the lowest engine speed and a predetermined speed and the sliding movement thereof controlling the accelerator for higher engine speeds.

5. In an accelerator control device as set forth in claim 4, ratchet mechanism operating to hold the pedal in any adjusted horizontal position when the pedal is fully depressed and means carried by the pedal operating to disengage said ratchet mechanism during the pivotal movements of the pedal.

6. An accelerator control device, comprising a support, a carriage slidable on said support, a pedal pivotally mounted on said carriage and having a spring normally holding it in raised position, a throttle operating member pivotally mounted and having a curved periphery, an arm or stem carried by said pedal adapted to traverse said curved periphery during the pivotal movements of the pedal to depress said member about its pivot, said carriage being slidable forwardly to cause said stem to further depress said member, and retractile means to return said carriage to rearmost position.

7. In an accelerator control device as set forth in claim 6, a rack-bar secured to said support, a pawl or dog pivotally secured to said carriage and adapted to engage said rack-bar when the pedal is fully depressed.

8. An accelerator control device, comprising a support, a carriage slidable on said support, a pedal pivotally mounted on said carriage and having a spring normally holding it in raised position, a throttle operating member pivotally mounted and having a curved periphery, an arm or stem carried by said pedal adapted to traverse said curved periphery during the pivotal movements of the pedal to depress said member about its pivot, said carriage being slidable forwardly to cause said stem to further depress said member, retractile means to return said carriage to rearmost position, a rack-bar secured to said support, a pawl or dog pivotally secured to said carriage and adapted to engage said rack-bar when the pedal is fully depressed, and means carried by said pedal to hold said dog free from said rack-bar during pivotal movements of the pedal.

In testimony whereof I affix my signature.

NAASON Z. BUTTERICK.